(12) United States Patent
Kondo et al.

(10) Patent No.: US 12,261,353 B2
(45) Date of Patent: Mar. 25, 2025

(54) DEVICE FOR VEHICLE

(71) Applicant: YOKOWO CO., LTD., Tokyo (JP)

(72) Inventors: Shota Kondo, Tomioka (JP); Toshihiko Fujii, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 77 days.

(21) Appl. No.: 17/926,627

(22) PCT Filed: May 12, 2021

(86) PCT No.: PCT/JP2021/018002
§ 371 (c)(1),
(2) Date: Nov. 21, 2022

(87) PCT Pub. No.: WO2021/241225
PCT Pub. Date: Dec. 2, 2021

(65) Prior Publication Data
US 2023/0187818 A1  Jun. 15, 2023

(30) Foreign Application Priority Data
May 25, 2020  (JP) ................. 2020-090279

(51) Int. Cl.
*H01Q 1/32* (2006.01)
*B60R 11/02* (2006.01)
*H01Q 1/02* (2006.01)
*H01Q 1/42* (2006.01)

(52) U.S. Cl.
CPC .......... *H01Q 1/3275* (2013.01); *B60R 11/02* (2013.01); *H01Q 1/02* (2013.01); *H01Q 1/42* (2013.01); *B60R 2011/0294* (2013.01)

(58) Field of Classification Search
CPC .......... H01Q 1/3275; H01Q 1/02; H01Q 1/42; B60R 11/02; B60R 2011/0294
See application file for complete search history.

(56) References Cited

U.S. PATENT DOCUMENTS

| | | | |
|---|---|---|---|
| 10,462,555 B2* | 10/2019 | Ito | H04R 1/2842 |
| 10,530,037 B2 | 1/2020 | Mizuno et al. | |
| 2012/0081256 A1* | 4/2012 | Aizawa | H01Q 21/28 |
| | | | 343/866 |
| 2019/0036198 A1 | 1/2019 | Mizuno et al. | |

(Continued)

FOREIGN PATENT DOCUMENTS

| | | |
|---|---|---|
| JP | S62-59118 A | 3/1987 |
| JP | 2004-306932 A | 11/2004 |
| JP | 2010-278056 A | 12/2010 |

(Continued)

OTHER PUBLICATIONS

Office Action issued on Jan. 9, 2024, in corresponding Japanese patent Application No. 2020-090279, 2 pages.

(Continued)

*Primary Examiner* — Seung H Lee
(74) *Attorney, Agent, or Firm* — XSENSUS LLP

(57) ABSTRACT

A device for a vehicle comprising: a base; a case that forms an accommodation area for accommodating an electronic device, together with the base; and a base pad attached to the base and having an opening portion, wherein the base has a vent for ventilation between the accommodation area and the opening portion.

17 Claims, 10 Drawing Sheets

(56) References Cited

U.S. PATENT DOCUMENTS

2019/0222922 A1 7/2019 Ito

FOREIGN PATENT DOCUMENTS

| | | |
|---|---|---|
| JP | 2016-116048 A | 6/2016 |
| JP | 2018-037914 A | 3/2018 |
| JP | 2019-125962 A | 7/2019 |
| JP | 2019-194091 A | 11/2019 |

OTHER PUBLICATIONS

International Search Report and Written Opinion mailed on Jul. 20, 2021, received for PCT Application PCT/JP2021/018002, filed on May 12, 2021, 9 pages including English Translation.

* cited by examiner

DEVICE FOR VEHICLE

CROSS-REFERENCE TO RELATED APPLICATIONS

The present application is based on PCT filing PCT/JP2021/018002, filed May 12, 2021, which claims priority to JP 2020-090279, filed May 25, 2020, the entire contents of each are incorporated herein by reference.

TECHNICAL FIELD

The present invention relates to a device for vehicle.

BACKGROUND ART

In the related art, as in Patent Document 1, for example, an antenna device for a vehicle has been proposed as a device for a vehicle. In the antenna device for a vehicle, an antenna base and an antenna case form an accommodation area for accommodating electronic devices such as an antenna element and a camera. Further, a base pad is attached to the antenna base so as to surround the peripheral edge of the antenna base. When the antenna device for a vehicle is attached to a vehicle roof, the base pad blindfolds the space area formed between the antenna base and the vehicle roof. In addition, a notch is formed at the rear end of the base pad, so that the water that has infiltrated into the accommodation area can be drained to the outside through the space area.

RELATED DOCUMENT

Patent Document

[Patent Document 1] Japanese Unexamined Patent Publication No. 2018-37914

SUMMARY OF THE INVENTION

Technical Problem

Incidentally, in the technique disclosed in Patent Document 1, water that has infiltrated into the accommodation area for accommodating an electronic device such as an antenna element or a camera cannot be sufficiently discharged to the outside of the antenna device for a vehicle. For example, the water may remain as residual water in the space area between the antenna base and the vehicle roof. Then, there has been a concern that residual water will generate a water film in the space area between the antenna base and the vehicle roof, which will accelerate the deterioration of parts at the mounting site where the antenna device for a vehicle is attached to the vehicle roof, for example.

An example of the object of the present invention is to improve the function of discharging water to infiltrate into the device, in a device for a vehicle.

Solution to Problem

A device for a vehicle according to the present invention includes:
a base;
a case that forms an accommodation area for accommodating an electronic device, together with the base; and
a base pad attached to the base, and having an opening portion, in which
the base has a vent for ventilation between the accommodation area and the opening portion.

Advantageous Effects of Invention

According to the above aspect of the present invention, the water that has infiltrated into the device for a vehicle can be efficiently discharged to the outside.

DESCRIPTION OF EMBODIMENTS

Hereinafter, the present embodiment will be described with reference to the drawings. In addition, in the present embodiment, an antenna device for a vehicle will be described as an example of the device for a vehicle.

<Overall Structure>

In explaining the present embodiment, for convenience, the front-rear direction of the vehicle to which an antenna device 1 for a vehicle is attached is the x direction, the left-right direction perpendicular to the x direction is the y direction, and the vertical direction perpendicular to the x direction and the y direction is the z direction.

The outline of the overall structure of the antenna device 1 for a vehicle will be described with reference to FIGS. 1 and 2.

Figure 1:
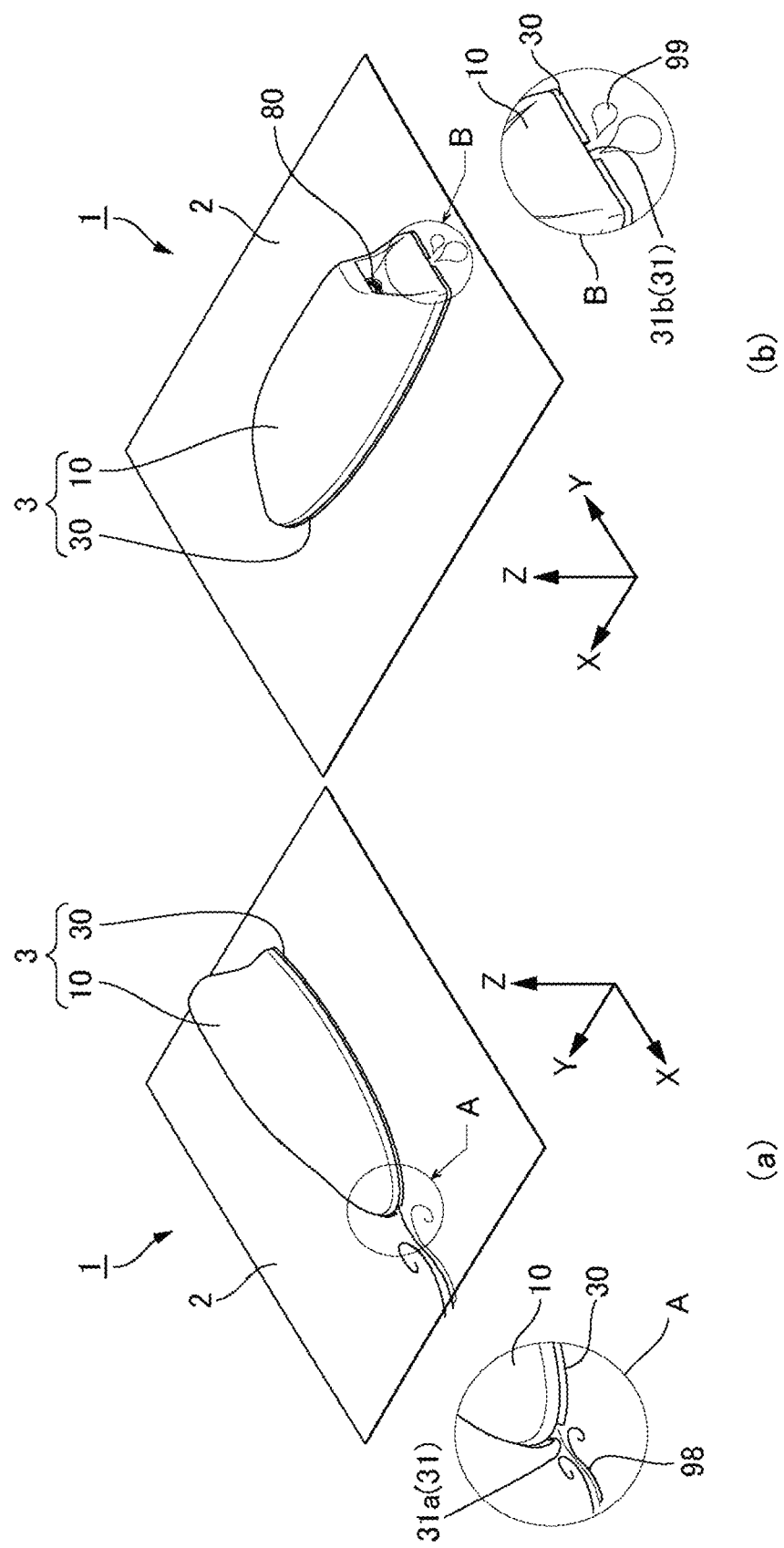
FIG. 1 is a perspective view of an antenna device for a vehicle according to an embodiment.

FIG. 1 is a perspective view showing the antenna device 1 for a vehicle of the present embodiment, and shows a state in which the antenna device 1 for a vehicle is attached to a vehicle roof 2. FIG. 1(a) is a perspective view seen from the front upper side, and FIG. 1(b) is a perspective view seen from the rear upper side. FIG. 2 is a cross-sectional view of the antenna device 1 for a vehicle, and shows a cut surface (X-Z plane) vertically cut at the center in the Y direction. The antenna device 1 for a vehicle is attached to the rear side of the vehicle roof 2 on the upper surface of the vehicle. As shown in FIG. 2, the antenna device 1 for a vehicle includes an antenna case 3, a planar antenna 61a used as a satellite digital radio antenna or a Global Navigation Satellite System (GNSS) antenna, a capacitive loading element 65 used as an AM/FM antenna, a coil element 61b, and a TEL antenna 61c that communicates using the frequency band of Long Term Evolution (LTE), an image pickup device 80, an antenna base portion 40, a seal 50, a base pad 30, and the like. In the present embodiment, an antenna unit including various antenna elements such as a planar antenna 61a, a capacitive loading element 65, a coil element 61b, and a TEL antenna 61c and an antenna substrate such as a circuit board (for example, a Print Circuit Board (PCB)) for mounting and electrically connecting the antenna elements (described simply as an antenna unit in the following description) and the image pickup device 80 are examples of electronic devices. The electronic device is not limited to this, and may be, for example, only the antenna unit or only the image pickup device 80. The antenna unit is not shown in drawings other than FIG. 2, except for the capacitive loading element 65.

The antenna case 3 covers the components configuring a part of the antenna device 1 for a vehicle, such as the antenna unit and the image pickup device 80 from above.

Figure 2:
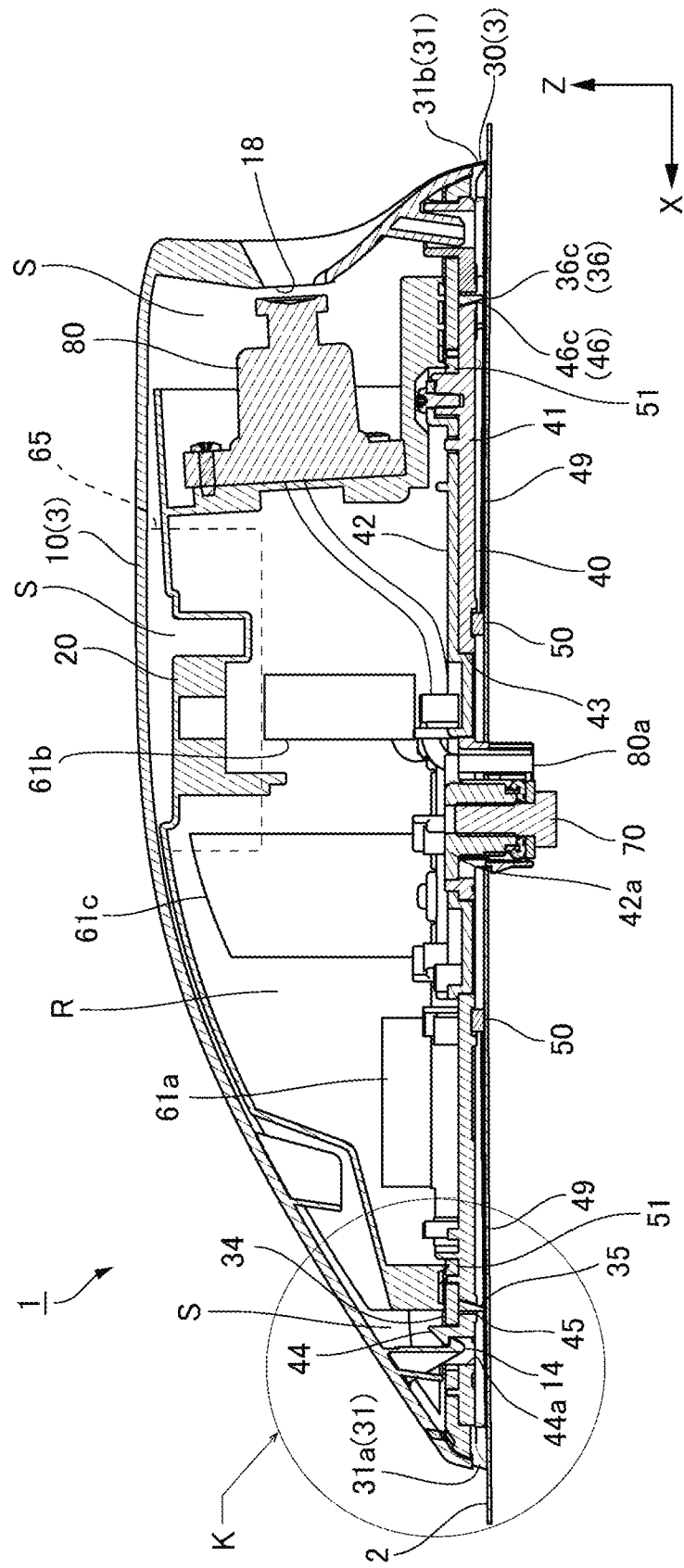
FIG. 2 is a cross-sectional view of the antenna device for a vehicle according to the embodiment.

The antenna case 3 has an outer case 10 and an inner case 20 (shown in FIG. 2). Then, as shown in FIG. 2, the antenna case 3 and the antenna base portion 40 form an accommodation area for accommodating an electronic device such as the antenna unit and the image pickup device 80. The accommodation area has an accommodation area S formed by the outer case 10 and the antenna base portion 40, and an accommodation area R formed by the inner case 20 and the antenna base portion 40. Although the details will be described later, the accommodation area S is defined as an area for accommodating the inner case 20 and the image pickup device 80.

The antenna case 3 has a double case structure composed of an outer case 10 and an inner case 20. All or a part of the antenna unit is accommodated in the accommodation area R formed by the inner case 20 and the antenna base portion 40. Further, the image pickup device 80 is attached to the rear portion of the inner case 20. The outer case 10 is provided so as to cover them. In the accommodation area S formed by the outer case 10 and the antenna base portion 40, the inner case 20, in which all or a part of the antenna unit is accommodated in the accommodation area R, and the image pickup device 80 are accommodated.

In addition, the base pad 30 is attached so as to surround the peripheral edge of the antenna base portion 40, and has a function of blindfolding the space area between the antenna base portion 40 and the vehicle roof 2. As shown in FIG. 2, the antenna device 1 for a vehicle is placed on the upper surface of the vehicle roof 2 by passing the protruding portion 42a that is provided on the lower surface of the antenna base portion 40 (metal base 42) described later and projects downward in the z direction through a mounting through hole (not shown) formed in the vehicle roof 2. Then, by screwing the bolt 70, which configures a part of the mounting component, from the lower side (inside the vehicle) of the vehicle roof 2 into the mounting hole provided in the protruding portion 42a, other components (not shown) of the mounting component can act so as to sandwich the vehicle roof 2 together with the antenna base portion 40 from the lower side of the vehicle roof 2. This action makes it possible to pull the antenna base portion 40 toward the vehicle roof 2 side, and the antenna device 1 for a vehicle is fixed to the vehicle roof 2. A gap (space area) is formed between the vehicle roof 2 and the antenna base portion 40 due to a difference in the shape of the vehicle roof 2 and the shape of the antenna base portion 40, a difference in materials, and the like. The base pad 30 is provided such that the gap cannot be seen from the outside, from an aesthetic point of view.

<Outer Case 10>

Next, the outer case 10 will be described with reference to FIGS. 2, 5, and 6.

Figure 5:
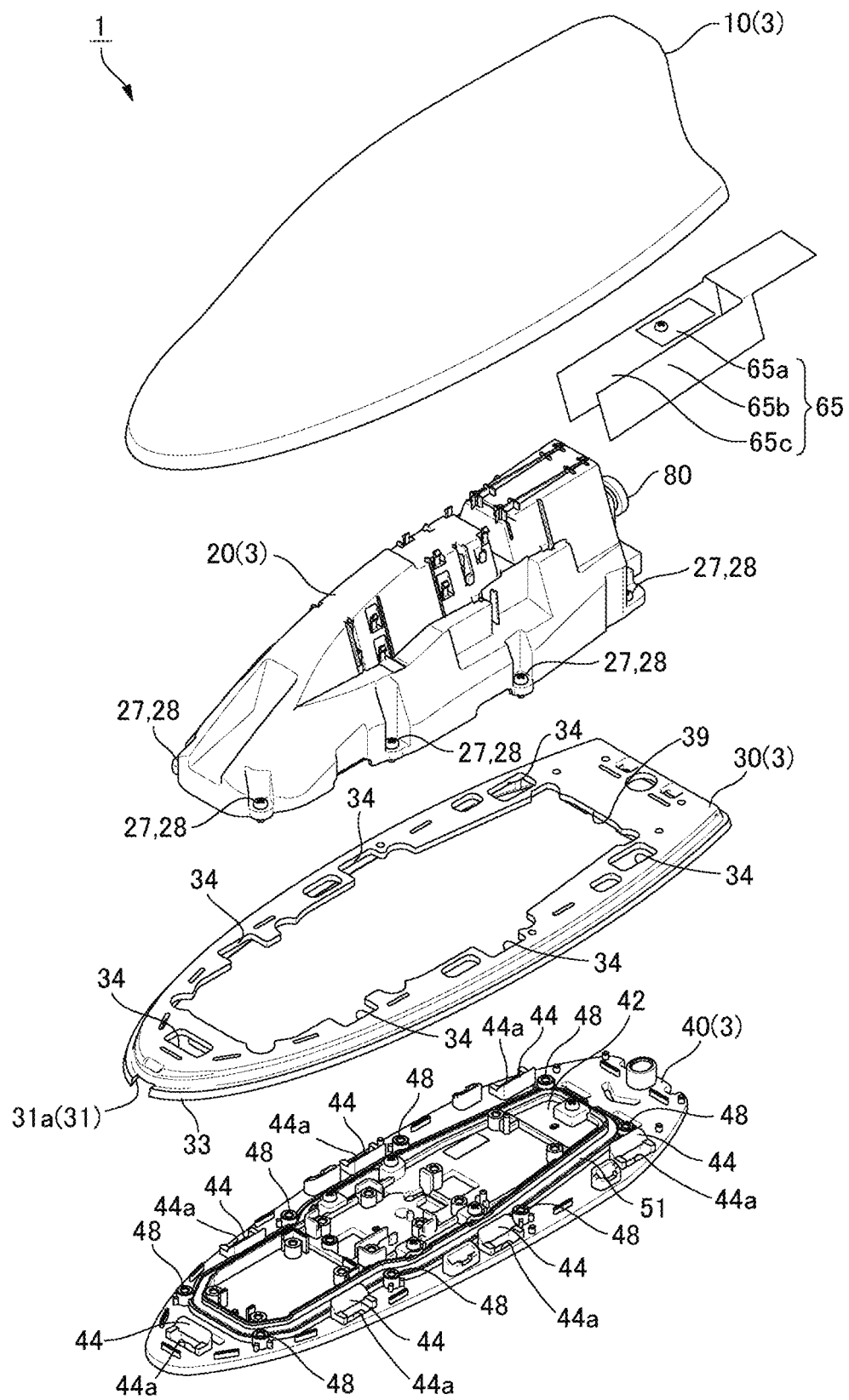
FIG. 5 is an exploded perspective view of the antenna device for a vehicle device according to the embodiment as viewed from above.

FIG. 5 is an exploded perspective view of the antenna device 1 for a vehicle as viewed from above. FIG. 6 is an exploded perspective view of the antenna device 1 for a vehicle as viewed from below. Note that the antenna unit is not shown except for the capacitive loading element 65 in FIG. 5, and the capacitive loading element 65 is not shown in FIG. 6.

The outer case 10 is a resin molded product made of a synthetic resin having non-translucency and radio wave transmission, containing polycarbonate and Acrylate Styrene Acrylonitrile (ASA), and has a shark fin shape that is inclined such that the front side in the x direction is lower than the rear side in the x direction and both sides are curved inward.

Figure 6:
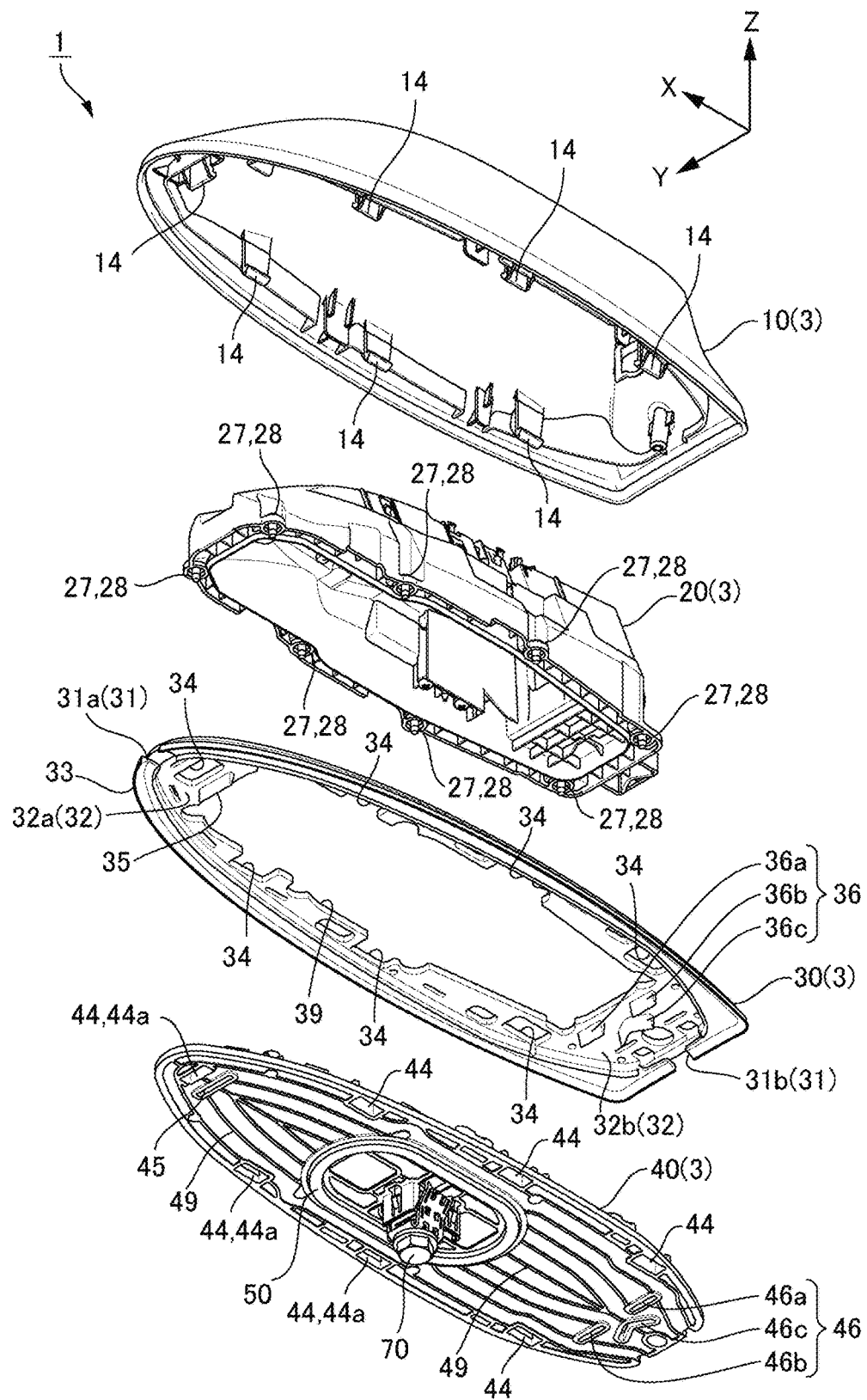
FIG. 6 is an exploded perspective view of the antenna device for a vehicle device according to the embodiment as viewed from below.

As shown in FIG. 6, the lower surface of the outer case 10 is open. Then, the inner case 20, the antenna unit, the image pickup device 80, and the like are covered from above in the z direction (see, for example, FIGS. 2 and 5).

In the rear in the x direction of the outer case 10, an image pickup opening 18 for exposing an image pickup unit such as a lens of the image pickup device 80 provided in the rear in the x direction of the inner case 20 to the outside of the outer case 10 is provided. The image pickup opening 18 is formed at the front end of a portion of the outer case 10 where the area in the rear in the x direction is concave to the front direction. In addition, in the present embodiment, the opening peripheral edge of the image pickup opening 18 and the image pickup unit of the image pickup device 80 are slightly separated (having a gap), and waterproof structure (not shown) may be provided as a matter of course for the waterproofing inside the outer case 10 at this portion.

As shown in FIG. 6, the outer case 10 is provided with a plurality of first locking pieces 14 for attachment to the antenna base portion 40 so as to project downward in the z direction from the lower surface side of the inner wall. In the present embodiment, seven first locking pieces 14 are used, but the number is not limited to this if there are a plurality of first locking pieces 14. When fixing the antenna base portion 40 to the outer case 10, the first locking piece 14 engages with the second locking piece 44 provided on the antenna base portion 40. That is, the outer case 10 and the antenna base portion 40 are fixed by the snap-fit structure. In addition, this snap-fit structure also has a function as a vent for ventilation (space area) between the accommodation area (particularly the accommodation area S) and the opening portion 31 described later, in addition to the engagement between the outer case 10 and the antenna base portion 40. The snap-fit structure is shown by the circle of reference numeral K in FIG. 2, and the details will be described later with reference to FIG. 7.

<Inner Case 20>

The inner case 20 will be described with reference to FIGS. 2, 5, and 6.

The inner case 20 is made of a synthetic resin having non-translucency and radio wave transmission (a resin molded product formed of a synthetic resin including polycarbonate and Acrylate Styrene Acrylonitrile (ASA)).

The inner case 20 has a lower surface that is open, and mainly covers the antenna unit from above in the z direction.

A plurality of screw holes 27 used for screwing the antenna base portion 40 with screws 28 are provided at the lower end of the inner case 20.

The image pickup device 80 is attached to a rear wall provided in the rear in the x direction of the inner case 20. The image pickup device 80 is fixed to the inner case 20 by being attached to the rear wall of the inner case 20 by screwing or the like. That is, in the present embodiment, the image pickup device 80 is on the outside of the inner case 20. The image pickup device 80 is electrically connected to an in-vehicle electronic device provided in the vehicle by, for example, the coaxial cable 80*a* shown in FIG. 2, via the accommodation area R of the inner case 20. Then, the image signal captured by the image pickup device 80 is transmitted to the in-vehicle electronic device by the coaxial cable 80*a*.

Figure 8:
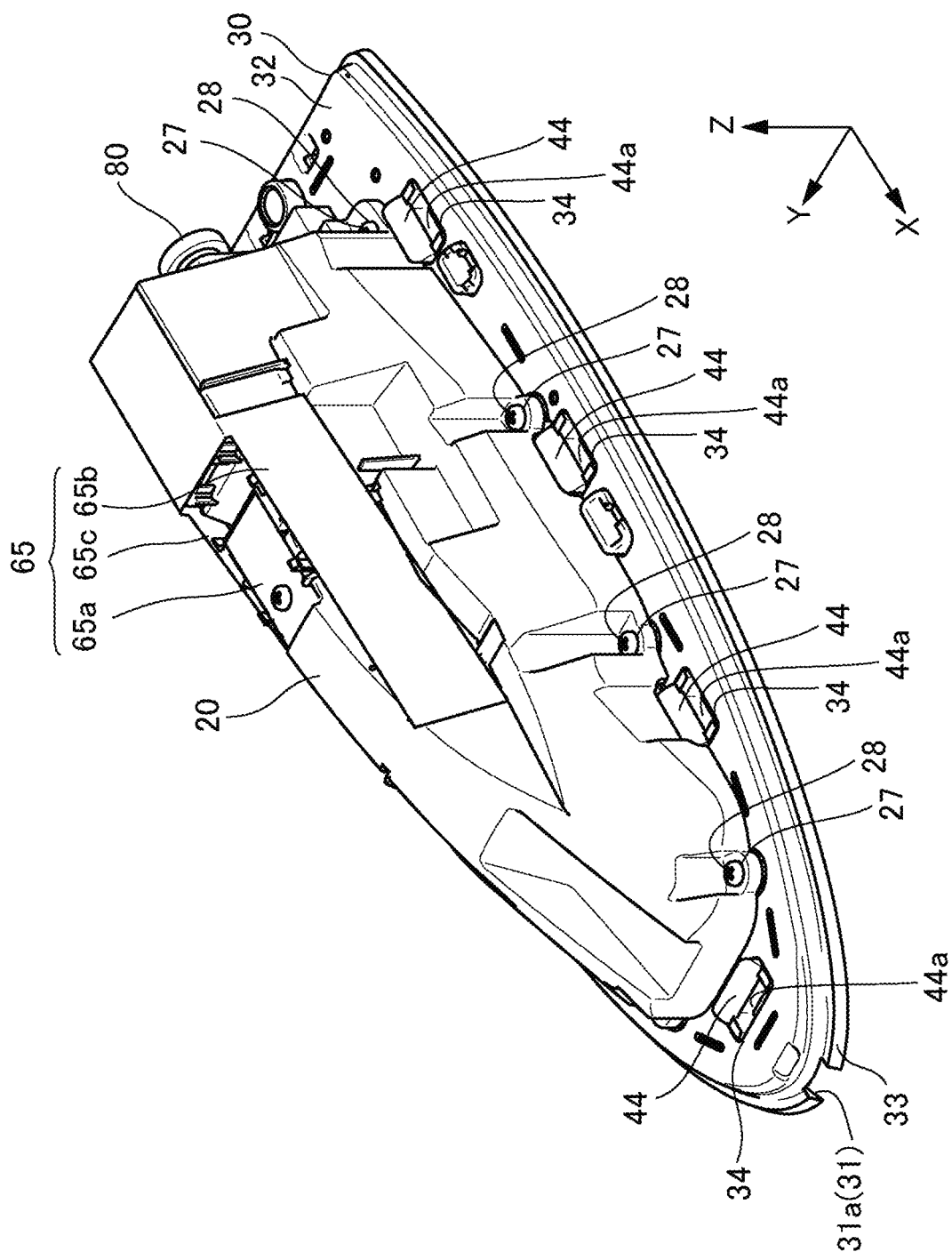
FIG. 8 is a perspective view showing the antenna device for a vehicle according to the embodiment with an outer case removed.

As shown in FIGS. 2, 5, and 8, the capacitive loading element 65 is mounted on the upper side and the side surface of the outer surface of the inner case 20. Here, the capacitive loading element 65 includes three elements 65*a*, 65*b*, and 65*c* integrally, and as shown in FIG. 8, the element 65*a* is fixed to the upper side of the outer surface of the inner case 20 with a screw or the like, the element 65*b* is attached along the upper one surface of the inner case 20, and the element 65*c* is attached along the upper other surface of the inner case 20. The capacitive loading element 65 is used for, for example, an AM/FM antenna, and is formed by processing a conductor plate such as a tin-plated steel plate or a stainless steel plate. Then, for example, an AM broadcast wave or an FM broadcast wave is received. In the present embodiment, the capacitive loading element 65 is provided on the outer surface of the inner case 20, but the present invention is not limited to this, and the capacitive loading element may be provided inside the inner case 20.

<Base Pad 30>

The base pad 30 will be described with reference to FIGS. 1, 5, and 6.

The base pad 30 is an annular elastic member made of elastomer, rubber, or the like. The base pad 30 has a pad surface 32 provided with the antenna base mounting opening portion 39 shown in FIG. 6, and a pad peripheral edge 33 extending downward in the z direction from the outer peripheral edge of the pad surface 32. The antenna base mounting opening portion 39 is provided such that its outer shell is outside the position of the inner pad 51 that is pressed when fixing the antenna base portion 40 and the inner case 20. The base surface of the antenna base portion 40 is exposed from the antenna base mounting opening portion 39. The metal base 42 is attached to the base surface, and a circuit board (antenna substrate) such as a PCB is installed. The base pad 30 may be pressed when fixing the inner case 20 and the antenna base portion 40 without providing the inner pad 51.

The base pad 30 is fitted into the lower end peripheral edge of the outer case 10, and the pad peripheral edge 33 functions as a blindfold from the outside of the space area (hereinafter, may be simply referred to as a space area) between the lower end peripheral edge of the outer case 10 and the vehicle roof 2.

As shown in FIGS. 5 and 6, a plurality of openings 31 are provided at the lower end of the pad peripheral edge 33 of the base pad 30. The plurality of openings 31 are formed, for example, as a notched structure. The plurality of openings 31 are used to take in the air 98 from the outside of the antenna device 1 for a vehicle, and to pass the air to the outside through the space area, and to discharge the water 99 that has infiltrated into the accommodation area S of the antenna device 1 for a vehicle to the outside. The plurality of openings 31 each have a front opening portion 31*a* provided at the front end in the x direction of the base pad 30 and a rear opening portion 31*b* provided at the rear end in the x direction.

The front opening portion 31*a* mainly functions as an intake port for taking in air 98 from the outside of the antenna device 1 for a vehicle into the space area (see enlarged view A of FIG. 1(*a*)). The rear opening portion 31*b* mainly functions as a discharge port for passing air to the outside through the space area, and also discharging the water 99 that has infiltrated into the space area from the accommodation area S of the antenna device 1 for a vehicle to the outside (see the enlarged view B of FIG. 1(*b*)). For example, since the front opening portion 31*a* is provided in the front in the x direction of the antenna device 1 for a vehicle, it is possible to take in (intake) the traveling wind (air 98) generated as the vehicle travels (the line expressed like a royal fern in the enlarged view A schematically shows how the air 98 is taken in). Taking in the traveling wind (air 98) acts, for example, to guide the residual water in the space area to the rear opening portion 31*b*, or to guide the water 99 that has infiltrated into from the accommodation area S to the rear opening portion 31*b*. Further, since the rear opening portion 31*b* is provided in the rear in the x direction of the antenna device 1 for a vehicle, the traveling wind (air 98) taken in from the front opening portion 31*a* passes through the space area and blows from the rear opening portion 31*b*. The water 99 in the space area can be discharged to the outside as the air 98 blows through (the blowout in the enlarged view B schematically shows how the air 98 blows through). Further, by improving the air permeability of the space area by the front opening portion 31*a* and the rear opening portion 31*b*, it is possible to reduce the residual water to prevent the generation of the water film.

On the pad surface 32 of the base pad 30, a plurality of locking piece arrangement portions 34 communicating upward and downward in the z direction are provided in the vicinity of the antenna base mounting opening portion 39 or as a part of the outer shell of the antenna base mounting opening portion 39.

When the inner case 20 is fixed to the antenna base portion 40 across the base pad 30, the second locking piece 44 provided on the antenna base portion 40 is inserted to the locking piece arrangement portion 34.

<Antenna Base Portion 40>

The antenna base portion 40 will be described with reference to FIGS. 3 to 6 and 9.

Figure 3:
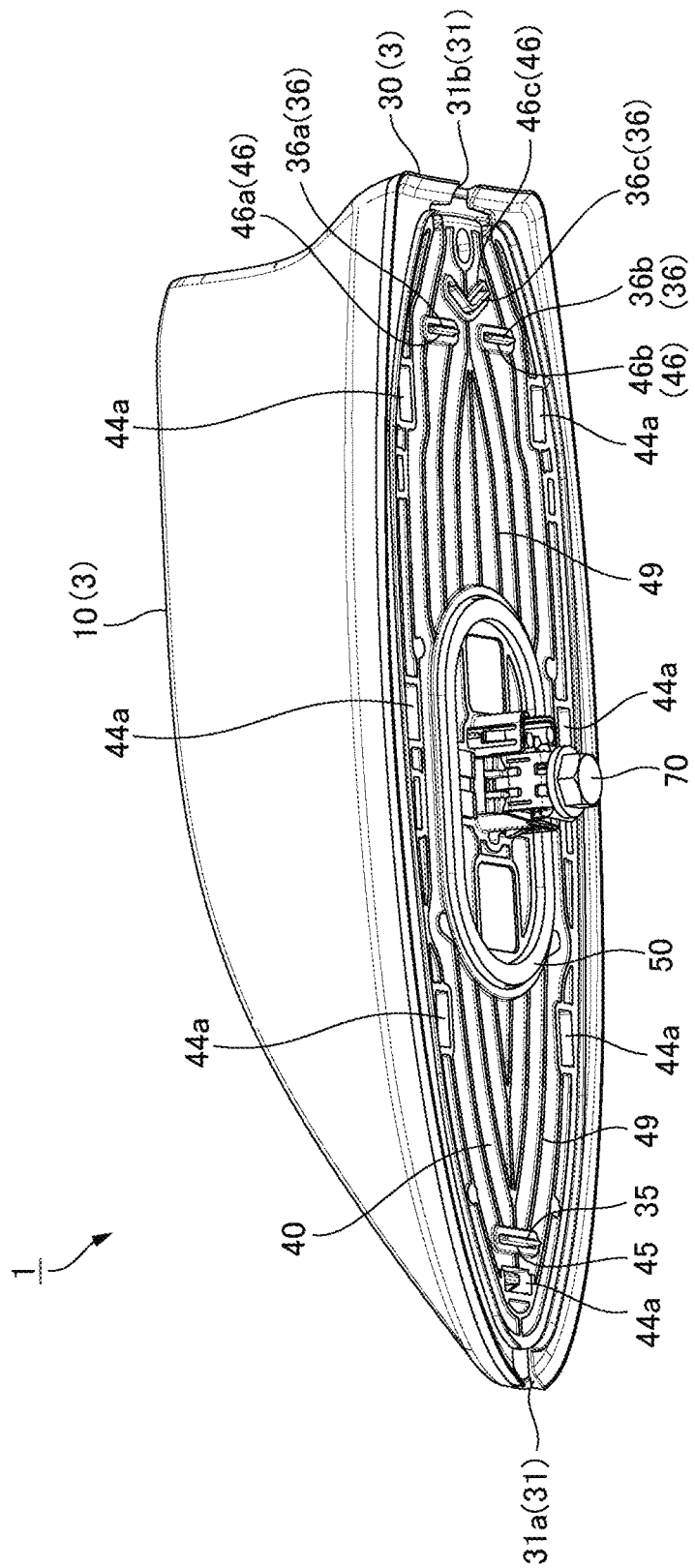
FIG. 3 is a perspective view of the antenna device for a vehicle according to the embodiment as viewed from below.
Figure 4:
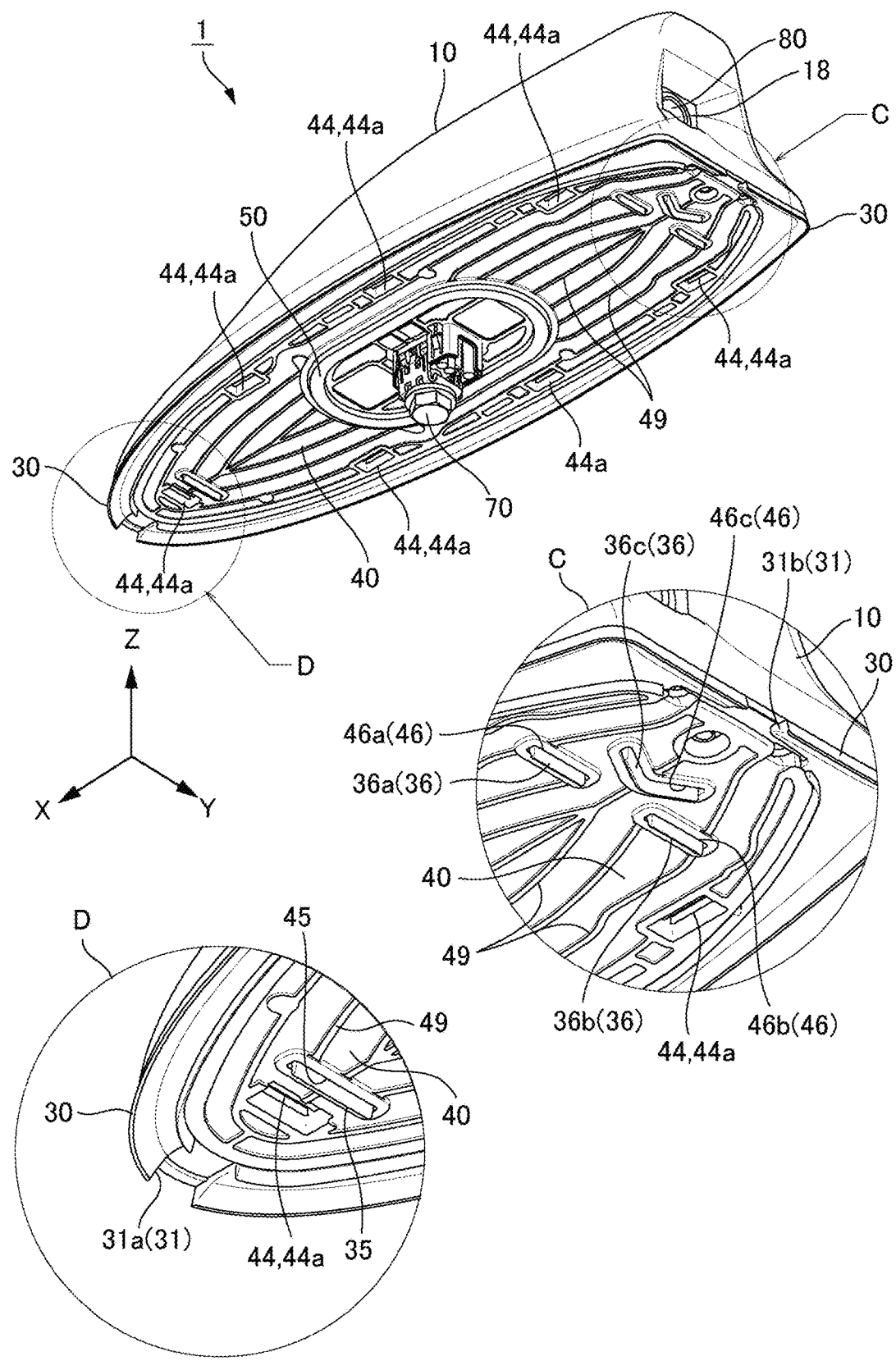
FIG. 4 is a perspective view of the antenna device for a vehicle according to the embodiment as viewed from below.
Figure 9:
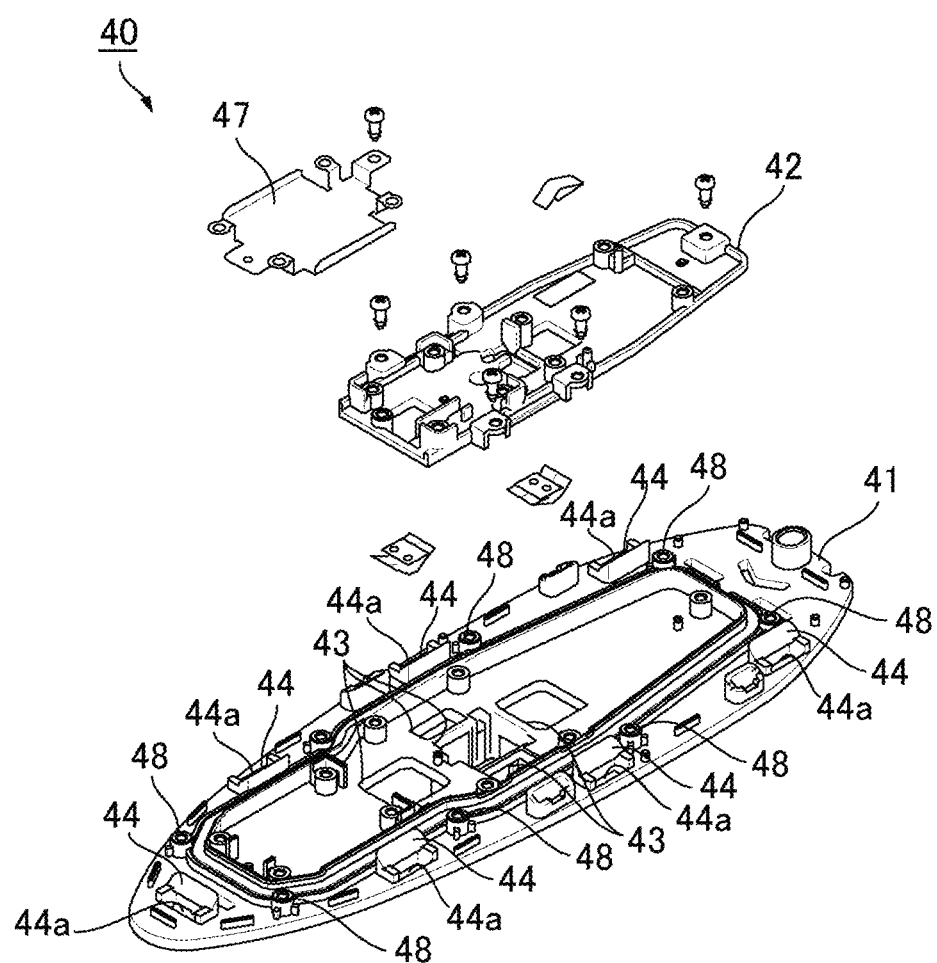
FIG. 9 is an exploded perspective view of an antenna base portion according to the embodiment as viewed from above.

FIG. 3 is a perspective view of the antenna device 1 for a vehicle as viewed from the lower side surface. FIG. 4 is a perspective view of the antenna device 1 for a vehicle as viewed from the rear lower side, and shows an enlarged view of an area D in the front in the x direction and an area C in the rear in the x direction. FIG. 9 is an exploded perspective view of the antenna base portion 40.

The antenna base portion 40 is a combination (complex body) of the resin base 41 of polybutylene terephthalate or the like and the metal base 42 of aluminum or the like attached to the upper surface of the resin base 41. In addition, it may be composed of only one of the metal base 42 and the resin base 41.

The antenna base portion 40 (here, the resin base 41) has, on the outer peripheral portion, second locking pieces 44 that engage with the first locking pieces 14 of the outer case 10 to lock the outer case 10 (for example, FIG. 5). As shown in FIG. 9, the second locking piece 44 is provided so as to extend upward to the outer edge portion of the opening 44*a* communicating upward and downward in the z direction.

The resin base 41 is provided with a plurality of (here, five in a cross shape) base portion openings 43 in a substantially central portion. The metal base 42 is attached so as to close these base portion openings 43. Further, a ground plate 47 (GND) is attached to the front in the x direction of the metal base 42 (see FIG. 9).

An antenna substrate is provided on the upper surface of the metal base 42, and antenna elements such as the coil element 61b and the TEL antenna 61c and an amplifier (not shown) are mounted on the antenna substrate. Further, the planar antenna 61a is provided on the ground plate 47 (GND).

A plurality of screw receiving bosses 48 used for screwing with the inner case 20 described above by screws 28 are provided on the peripheral edge of the resin base 41.

An inner pad 51 (see, for example, FIG. 5) is attached to the peripheral edge of the upper surface of the resin base 41 and inside the screw receiving boss 48. The inner pad 51 is an annular elastic member made of elastomer, rubber, or the like, and is provided on the upper surface of the resin base 41.

When the inner case 20 and the antenna base portion 40 (here, the resin base 41) are fixed by screwing, the inner pad 51 is pressed by the lower end of the inner case 20 and the upper surface of the resin base 41. Then, the space between the inner case 20 and the antenna base portion 40 is sealed.

The antenna unit (antenna substrate, antenna element, or the like) is disposed inside the area of the resin base 41 to which the inner pad 51 is attached. The cable (not shown) connected to the antenna substrate of the antenna unit extends downward in the z direction of the antenna base portion 40 via the base portion openings 43 provided in the resin base 41. Then, using a cable, for example, a signal received by an antenna element and processed by a circuit of an antenna substrate or the like is transmitted to an in-vehicle electronic device provided in the vehicle.

A front decompression rib arrangement portion 45 through which the front decompression rib 35 is inserted is provided in the area in the front in the x direction of the resin base 41, specifically, in the rear in the x direction from the second locking piece 44 provided in the front in the x direction of the resin base 41.

Further, a rear decompression rib arrangement portion 46 through which the above-described rear decompression rib 36 is inserted is provided in the area in the rear in the x direction of the resin base 41. Specifically, a first rear decompression rib arrangement portion 46a through which the first rear decompression rib 36a is inserted, a second rear decompression rib arrangement portion 46b through which the second rear decompression rib 36b is inserted, and a third rear decompression rib arrangement portion 46c through which the third rear decompression rib 36c is inserted are provided. The functions of the front decompression rib 35 and the rear decompression rib 36 will be described later.

<Rectifying Rib 49 of Antenna Base Portion 40>

A rectifying rib 49 extending approximately in the x direction is formed on the lower surface of the resin base 41 of the antenna base portion 40, that is, the surface on the side facing the vehicle roof 2. Specifically, in the front portion in the x-direction of the resin base 41, more specifically, in the front area in the x-direction from the portion where the seal 50 is disposed, a plurality of rectifying ribs 49 are formed some of which are linear and some of which follow the outer shell of the resin base 41, from the tip side (position near the front opening portion 31a of the base pad 30) rearward in the x direction.

In the rear portion in the x-direction of the resin base 41, specifically, in the rear area in the x-direction from the portion where the seal 50 is disposed, a plurality of rectifying ribs 49 are formed some of which are linear and some of which follow the outer shell of the resin base 41, from the seal 50 toward the rear end side (position near the rear opening portion 31b of the base pad 30).

Figure 7:
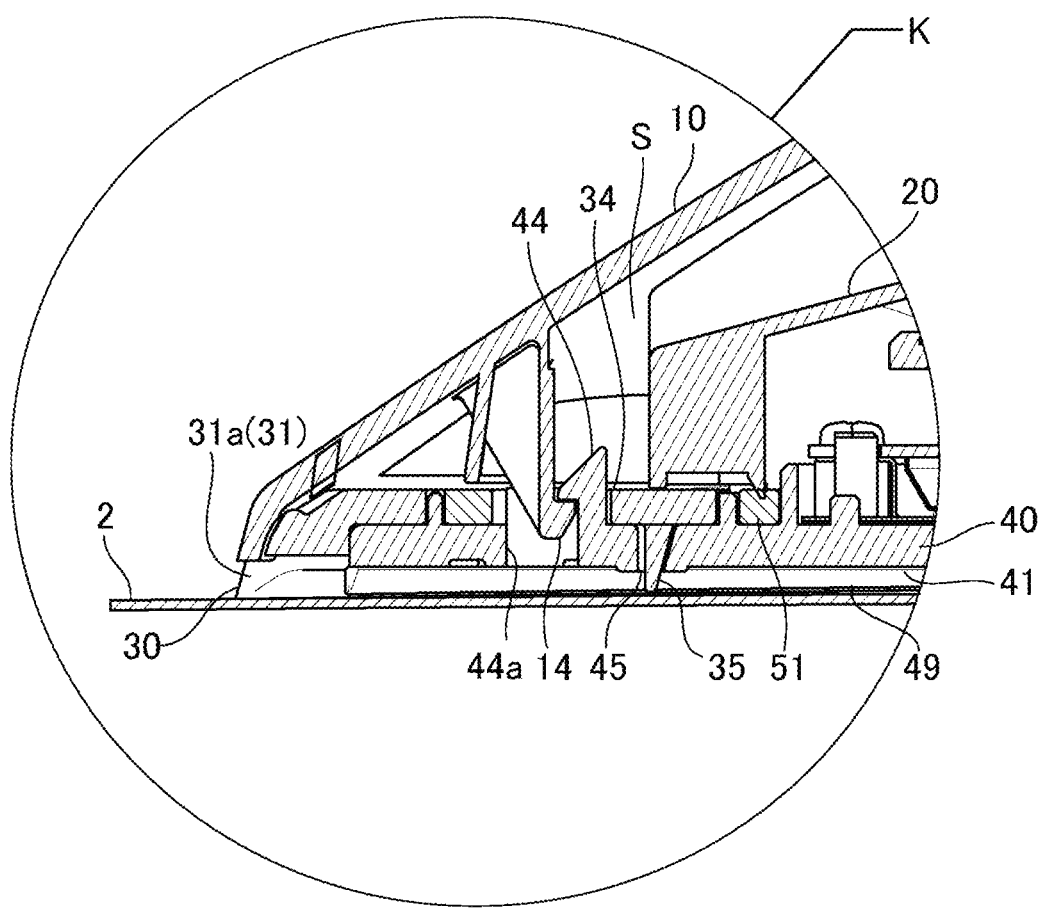
FIG. 7 is an enlarged view showing an area K in the cross-sectional view of FIG. 2, according to the embodiment.

The extension length (height) of the rectifying rib 49 downward in the z direction is set such that the tip of the rectifying rib 49 is slightly separated from the vehicle roof 2 when the antenna device 1 for a vehicle is attached to the vehicle roof 2 (see, for example, FIGS. 2 and 7).

The rectifying rib 49 rectifies the air flow in the space area between the antenna base portion 40 and the vehicle roof 2 in the x direction (front-rear direction). Thus, for example, as compared with the case where ribs are formed in a grid pattern on the lower surface of the antenna base portion 40, the air flow from the inside (accommodation area S) of the antenna device 1 for a vehicle or the front opening portion 31a to the rear opening portion 31b is improved, and the water 99 that has infiltrated into the accommodation area S can be efficiently discharged to the outside through the space area.

Then, for example, the air taken in from the outside of the antenna device 1 for a vehicle is rectified toward the rear opening portion 31b of the base pad 30 as the vehicle travels, thereby improving the air permeability of the space area, and reducing the residual water in the space area to prevent the generation of water film.

<Decompression Ribs (Front Decompression Rib 35, Rear Decompression Rib 36)>

As shown in FIG. 6, a plurality of ribs 35 and 36 extending downward in the z direction are provided on the bottom surface of the pad surface 32 of the base pad 30. Specifically, the base pad 30 has a front decompression rib 35 extending downward in the z direction from the bottom surface 32a on the front side in the x direction of the pad surface 32, and a plurality of rear decompression ribs 36 extending downward in the z direction from the bottom surface 32b on the rear side in the x direction.

The significance of providing the decompression ribs (front decompression rib 35, rear decompression rib 36) will be briefly described. As described above, by providing the base pad 30 with the openings 31 (front opening portion 31a, rear opening portion 31b), the water 99 that has infiltrated into the accommodation area S is efficiently discharged through the space area. Then, it is possible to improve the air permeability of the space area between the antenna base portion 40 of the antenna device 1 for a vehicle and the vehicle roof 2, and reduce the residual water to prevent the generation of the water film.

On the other hand, the opening portion 31 (front opening portion 31a, rear opening portion 31b) can also be an infiltration route for water 99. When cleaning a vehicle by using a high-pressure washer, the water 99 may infiltrate into the above-described space area through the opening portion 31. In that case, when the decompression ribs (front decompression rib 35, rear decompression rib 36) are not provided, the water 99 may strongly hit the seal 50. This may accelerate the deterioration of the seal 50. Assuming that water 99 may infiltrate vigorously, the decompression ribs (front decompression rib 35, rear decompression rib 36) are provided in the openings 31 (front opening portion 31a, rear opening portion 31b), and the water pressure of the water 99 to infiltrate at high pressure is reduced to prevent the water from directly hitting the seal 50.

The front decompression rib 35 is formed in the vicinity of the front opening portion 31a so as to extend in the y direction (left and right) with a predetermined width at the center in the y direction. The predetermined width is wider than the width of the front opening portion 31a in the y direction (left and right). The extension length (height) of the front decompression rib 35 downward in the z direction is set such that when the antenna device 1 for a vehicle is fixed to the vehicle roof 2, the tip of the front decompression rib 35 abuts on and presses the vehicle roof 2.

When the inner case 20 is fixed to the antenna base portion 40 (resin base 41) across the base pad 30, the front decompression rib 35 is inserted into the front decompression rib arrangement portion 45 provided as an opening in the antenna base portion 40. Then, when the front decompression rib 35 is inserted into the front decompression rib arrangement portion 45, the front decompression rib 35 is sandwiched between the inner case 20 and the vehicle roof 2. By being sandwiched between the inner case 20 and the vehicle roof 2, the front decompression rib 35 decompresses the water 99 that infiltrates at high pressure from the front opening portion 31a and prevents collapse due to the water pressure.

The rear decompression rib 36 has a first rear decompression rib 36a, a second rear decompression rib 36b, and a third rear decompression rib 36c in the vicinity of the rear opening portion 31b.

The third rear decompression rib 36c is formed so as to extend in the y direction (left and right) with a predetermined width in the center of the y direction, in the vicinity of the rear opening portion 31b. The third rear decompression rib 36c is formed in a substantially V-shape whose center is convex to the front in the x direction when viewed from below. The predetermined width in the y direction (left and right) is wider than the width in the y direction (left and right) of the rear opening portion 31b. Due to the substantial V-shape, the air flow rearward in the x direction by the rectifying rib 49 is not obstructed. Further, by making the width wider than the rear opening portion 31b and making the center convex to the front in the x direction, the water 99 infiltrating from the rear opening portion 31b at high pressure can be decompressed.

The first rear decompression rib 36a and the second rear decompression rib 36b are formed so as to be separated in the y direction and to extend in the y direction (left and right) with respective predetermined widths between the third rear decompression rib 36c and the antenna base mounting opening portion 39. The first rear decompression rib 36a and the second rear decompression rib 36b are provided symmetrically. The extension length (height) of the rear decompression rib 36 (the first rear decompression rib 36a, the second rear decompression rib 36b, and the third rear decompression rib 36c) in the z direction is set such that the tip of the rear decompression rib 36 abuts on and presses the vehicle roof 2, as in the front decompression rib 35.

When the inner case 20 is fixed to the antenna base portion 40 across the base pad 30, the rear decompression rib 36 is inserted into the rear decompression rib arrangement portion 46 provided as an opening in the resin base 41 of the antenna base portion 40. When the rear decompression rib 36 is inserted into the rear decompression rib arrangement portion 46, the rear decompression rib 36 is sandwiched between the inner case 20 and the vehicle roof 2. By being sandwiched between the inner case 20 and the vehicle roof 2, the rear decompression rib 36 decompresses the water 99 that infiltrates at high pressure from the rear opening portion 31b and prevents collapse due to the water pressure.

The first rear decompression rib 36a, the second rear decompression rib 36b, and the third rear decompression rib 36c are inserted through and adhered to the first rear decompression rib arrangement portion 46a, the second rear decompression rib arrangement portion 46b, and the third rear decompression rib arrangement portion 46c, respectively.

The front decompression rib 35 and the rear decompression rib 36 are not limited to the above-described configurations, and various modes are possible in the number of arrangements, arrangement positions, and shapes of each. For example, a plurality of the front decompression ribs 35 may be used, like the rear decompression ribs 36. Further, instead of a linear shape, it may be curved and V-shaped when viewed from below. The same applies to the rear decompression rib 36, and for example, the rear decompression rib 36 may be formed of one rib in a straight line like the front decompression rib 35. Further, when there are a plurality of rear decompression ribs 36, the pressed state of the third rear decompression rib 36c closest to the rear opening portion 31b is set to be the strongest, and the pressed state of the first rear decompression rib 36a and the second rear decompression rib 36b may be weakened or slightly separated from each other.

<Fixing the Antenna Device 1 for a Vehicle to the Vehicle Roof 2>

As described above, the antenna device 1 for a vehicle is mounted on the vehicle roof 2 by screwing the bolt 70, which is a mounting component, into the mounting hole of the protruding portion 42a provided in the antenna base portion 40.

<Seal 50>

On the lower surface of the resin base 41 of the antenna base portion 40, a seal 50, which is an annular elastic member made of an elastomer, rubber, urethane, silicon foam, or the like, is provided to surround the base portion openings 43. The seal 50 watertightly seals the space between the resin base 41 and the vehicle (that is, the vehicle roof 2).

In the present embodiment, the seal 50 does not have an area extending linearly in the y direction (left and right), in the front and the rear in the x direction. Specifically, the front and the rear of the seal 50 in the x direction are formed convex in an arc shape, respectively. Due to this shape, even when water 99 adheres to the seal 50, the water can be smoothly flowed backward by the air 98 taken in from the opening portion 31 and residual water can be reduced.

<Antenna Unit>

As described above, the antenna unit includes an antenna substrate and various antenna elements (planar antenna 61a, capacitive loading element 65, coil element 61b, TEL antenna 61c, or the like) mounted on the antenna substrate. The antenna element may be attached to the inside of the inner case 20 or may be attached to the resin base 41.

<Fixing of the Outer Case 10 and the Antenna Base Portion 40 by Snap-Fitting>

A snap-fit structure for engaging the outer case 10 and the antenna base portion 40 will be described with reference to FIG. 7.

As shown in FIG. 7, the outer case 10 and the antenna base portion 40 are fixed by the snap-fit structure.

Specifically, the claw portion of the first locking piece 14 provided on the inner wall surface of the outer case 10 is locked with the claw portion of the second locking piece 44 provided on the resin base 41 of the antenna base portion 40. The second locking piece 44 of the resin base 41 is formed so as to extend upward in the z direction from the outer shell of the opening 44a communicating upward and downward in the z direction. The opening 44a in the x direction has the size having a certain width in which the accommodation area S and the space area communicate with each other, from the front end in the x direction of the first locking piece 14 to the front in the x direction, in the state where the claw portion of the first locking piece 14 and the second locking piece 44 are engaged with each other. When the claw portion of the first locking piece 14 is locked to the claw portion of the second locking piece 44, the first locking piece 14 is elastically deformed by using the opening 44a and is engaged with the claw portion of the second locking piece 44. Then, as shown in FIG. 7, the opening 44a, in the state where the claw portion of the first locking piece 14 and the claw portion of the second locking piece 44 are engaged with each other, is in an open state such that the accommodation area S and the space area communicate with each other. In addition, for the opening 44a, a structure formed for removing the mold in the molding process at the time of manufacturing may be used, or the opening 44a may be provided exclusively for the above function when it is not necessary in the molding process.

By having the snap-fit structure like this, the opening 44a in the portion where the second locking piece 44 is formed communicates with the antenna base portion 40, specifically, the space above and below the resin base 41 in the z direction, in a state where the first locking piece 14 and the second locking piece 44 are locked with each other. Then, the opening 44a functions as a vent for ventilation between the accommodation area S and the rear opening portion 31b.

The opening 44a sends, to the space area, the external air taken into the accommodation area S from a gap between the image pickup unit of the image pickup device 80 and the outer case 10, or the like. Further, since the air flow between the opening 44a and the rear opening portion 31b is formed through the rectifying rib 49, the air permeability to the outside of the antenna device 1 for a vehicle is improved. Then, even when the water 99 has infiltrated into the upper space of the antenna base portion 40 (that is, the accommodation area S between the outer case 10 and the inner case 20), for example, from the gap between the image pickup unit of the image pickup device 80 and the outer case 10, water is allowed to flow from the opening 44a into the lower space of the antenna base portion 40 (the space area between the antenna base portion 40 and the vehicle roof 2). Further, the water 99 is discharged to the outside of the antenna device 1 for a vehicle from the rear opening portion 31b formed in the base pad 30, through the rectifying rib 49 formed on the lower surface of the antenna base portion 40.

Although it has been described so far that the base pad 30 is provided with both the front opening portion 31a and the rear opening portion 31b, the front opening portion 31a may not be provided if the opening 44a is provided. That is, if the opening 44a has the same function as the front opening portion 31a, the front opening portion 31a may not be provided, and the opening 44a and the rear opening portion 31b may be provided. Further, the opening 44a may be provided only in the front in the x direction from the position where at least the seal 50 is provided. In that case, the opening 44a is not provided in the rear in the x direction from the position where the seal 50 is provided.

In FIG. 7, the engagement between the first locking piece and the second locking piece 44 in the front in the x direction of the outer case 10 and the antenna base portion 40, and the opening 44a have been described. The other six first locking pieces, the second locking piece 44, and the opening 44a are provided on the sides of the outer case 10 and the antenna base portion 40, as shown in FIGS. 5 and 6. Then, the second locking pieces 44 are formed so as to extend upward in the z direction from the outer shell of the opening 44a communicating upward and downward in the z direction. These openings 44a have the size in the y direction having a certain width in which the accommodation area S and the space area communicate with each other, from the left (or right) end of the first locking piece 14 in the y direction to the left (or right) side in the y direction, in a state where the claw portion of the first locking piece 14 and the claw portion of the second locking piece 44 are engaged with each other. In the present embodiment, it has been described that the opening 44a is provided as a snap-fit structure in the engagement between the seven first locking pieces 14 and the second locking piece 44, but the present invention is not limited to this, and at least one opening 44a may be provided. In this case, the opening 44a having a certain width is provided in the front in the x direction of the position of the seal 50, and in the engagement between the other first locking piece 14 and the second locking piece 44, the opening 44a may not be formed.

As compared with the case where the outer case 10 and the antenna base portion 40 are screw-fixed, by fixing the outer case 10 and the antenna base portion 40 by the snap-fit structure, it is possible to reduce the stress generated in the boss portion used for screw fixing, and prevent chemicals such as detergent from accumulating inside the outer case 10 and causing cracks in the boss portion due to chemical cracks.

Figure 10:
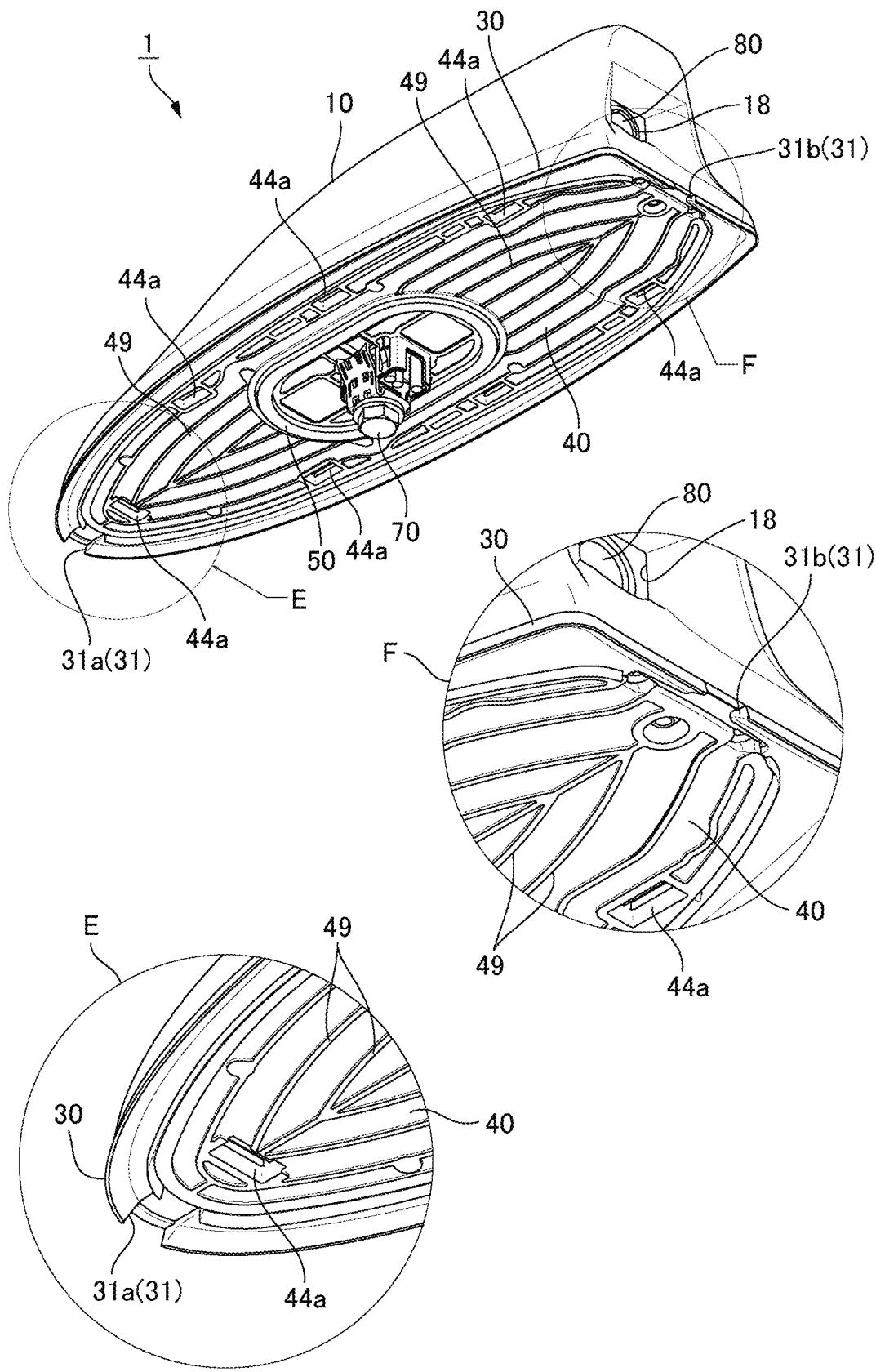
FIG. 10 is a perspective view of an antenna device for a vehicle according to a modification example of the embodiment as viewed from below.

Although the embodiment of the present invention has been described above, these are examples of the present invention, and various configurations other than the above can be adopted. FIG. 10 shows a modification example of the antenna device 101 for a vehicle. The difference from the above-described embodiment is that the decompression ribs (front decompression rib 35, rear decompression rib 36) are not present. The antenna device 101 for a vehicle is suitable for a vehicle whose destination is an area where a high-pressure washer is not used, or a vehicle such as a large vehicle where a high-pressure washer cannot be used.

Further, although not shown, when the outer case 10 and the antenna base portion 40 are fixed by screwing instead of snap-fitting, there is no opening at the position where the second locking piece 44 is formed. However, a through hole penetrating the upper and lower parts of the antenna base portion 40 in the z direction may be formed in the vicinity of the second locking piece 44 so as to have a function as a vent similar to the above-described opening 44a. The position where the through hole is provided is preferably in the front in the x direction from the position of the seal 50. That is, by providing the through hole in the front in the x direction from the seal 50, the flow of air 98 in the space area between the antenna base portion 40 and the vehicle roof 2 can be formed from the area of the seal 50 in the front in the x direction to the rear opening portion 31b in the rear in the x direction.

Further, the decompression rib is provided on the base pad 30, but without being limited to this, may be provided on the antenna base portion 40.

Although the antenna unit and the image pickup device 80 have been described as an example of the electronic device of the present embodiment, the present invention can be applied to other electronic devices without deviating from the gist of the present invention.

Further, although it has been described that the front opening portion 31a is provided at the tip of the base pad 30 in the front in the x direction, the present invention is not limited to this, and a plurality of front openings 31a may be provided on the side in the front in the x direction. In this case, any position may be used as long as it is the side in the front in the x direction from the mounting position of the seal 50 described above.

The features of the device for a vehicle of the present invention are summarized as follows.

(Aspect 1)

A device for a vehicle of Aspect 1 includes
a base;
a case that forms an accommodation area for accommodating an electronic device, together with the base; and
a base pad attached to the base, and having an opening portion, in which
the base has a vent for ventilation between the accommodation area and the opening portion.

According to Aspect 1, the vent for ventilation between the accommodation area and the opening portion of the pad improves, for example, the air permeability of the space area formed between the vehicle roof and the base, and can efficiently discharge water that has infiltrated into the accommodation area from the opening portion provided in the pad through the space area. Further, residual water in the space area is prevented, thereby preventing the generation of a water film, and preventing, for example, the deterioration of a member (for example, a sealing member) disposed in the space area formed when attached to a vehicle.

(Aspect 2)

Aspect 2 is the device for a vehicle, in which
the case has a first case (inner case), and a second case (outer case) provided so as to cover the first case,
the accommodation area has
a first accommodation area that is formed by the first case and the base, and accommodates at least a part of the electronic device, and
a second accommodation area formed by the first case, the second case, and the base, and
the vent is provided at a position that enables ventilation between the second accommodation area and the opening portion.

According to Aspect 2, when the case has a so-called double case structure,
the vent is provided at a position that enables ventilation between the second accommodation area and the opening portion of the pad. That is, providing the vent at a position that enables ventilation between the accommodation area formed by the outer case and the opening portion improves, for example, the above-described air permeability of the space area, and the water that has infiltrated into the space area can be effectively discharged from the second accommodation area. In addition, it is possible to prevent the generation of a water film and prevent the deterioration of the member (for example, the sealing member) disposed in the space area.

The "at least a part of an electronic device" may be a part of components configuring the electronic device, or when there are a plurality of electronic devices, it may be one or more of the plurality of electronic devices.

(Aspect 3)

Aspect 3 is the device for a vehicle, in which
a sealing member is provided on the base,
the opening portion is provided behind the base pad, and
the vent is provided at least on a side opposite to a position where the opening portion is provided with respect to a position where the sealing member is provided.

According to Aspect 3, air from the vent can flow from the front to the rear of the sealing member, for example, along the side surface of the sealing member. That is, the water adhering to the sealing member can be effectively discharged, and the air permeability around the sealing member can be improved to prevent the generation of a water film.

(Aspect 4)

Aspect 4 is the device for a vehicle, in which
the device for a vehicle has a snap-fit structure as a structure for fixing the case and the base, and
an opening provided in the snap-fit structure function as the vents.

According to the fourth aspect, in the snap-fit structure, in addition to the engagement between the case and the base, the opening used for the engagement is used as the vent, so that it is not necessary to provide, for example, a through hole dedicated to ventilation. Further, the snap-fit structure can prevent the occurrence of problems such as cracking of the fixing structure (particularly, the screw fastening boss) between the outer case and the base, as compared with screw fixing.

(Aspect 5)

Aspect 5 is the device for a vehicle, in which
the base has a rectifying unit that rectifies an air flow from the vent toward the opening portion.

According to Aspect 5, since the air flow from the vent is rectified toward the opening portion, the ventilation between the vent (accommodation area) and the opening portion can be improved, and the water can be efficiently discharged.

(Aspect 6)

Aspect 6 is the device for a vehicle, in which
the rectifying unit is a rib extending from a bottom surface of the base.

According to the sixth aspect, since the rib can be integrally formed when the base is manufactured, the number of parts can be reduced and the cost can be reduced.

(Aspect 7)

Aspect 7 further includes a protective wall provided between the opening portion and the sealing member, in the device for a vehicle.

According to the seventh aspect, since there is the protective wall, even when water vigorously (at high pressure) infiltrates from the opening portion, water does not directly hit the sealing member, so that deterioration of the sealing member due to the impact of water can be prevented.

This application is based upon and claims the benefit of priority from Japanese Patent Application No. 2020-090279, filed May 25, 2020, the entire contents of which are incorporated herein by reference.

REFERENCE SIGNS LIST

1: antenna device for a vehicle
2: vehicle roof
3: antenna case
10: outer case (second case)
14: first locking piece
18: image pickup opening
20: inner case (first case)
27: screw hole
28: screw
30: base pad
31: opening portion
31a: front opening portion
31b: rear opening portion
32: pad surface
32a: bottom 32b: bottom
33: pad peripheral edge
34: locking piece arrangement portion
35: front decompression rib
36: rear decompression rib
36a: first rear decompression rib
36b: second rear decompression rib
36c: third rear decompression rib
39: antenna base mounting opening portion
40: antenna base portion
41: mold base
42: metal base
42a: protruding portion
43: base portion opening
44: second locking piece
44a: opening
45: front decompression rib arrangement portion
46: rear decompression rib arrangement portion
46a: first rear decompression rib arrangement portion
46b: second rear decompression rib arrangement portion
46c: third rear decompression rib arrangement portion
48: screw receiving boss
47: ground plate
49: rectifying rib
50: seal
61a: planar antenna
61b: coil element
61c: TEL antenna
65: capacitive loading element
65a, 65b, 65c: element
70: bolt
80: image pickup device
98: air
99: water
101: antenna device for a vehicle
S: accommodation area (first accommodation area)
R: accommodation area (second accommodation area)

The invention claimed is:

1. A device for a vehicle comprising:
a base;
a case that forms an accommodation area for accommodating an electronic device, together with the base;
a base pad attached to the base and having an opening portion; and
a snap-fit structure as a structure for fixing the case and the base, wherein
the base has a vent for ventilation between the accommodation area and the opening portion, and
an opening that is provided in the snap-fit structure functions as the vent.

2. The device for a vehicle according to claim 1, wherein
the case has a first case, and a second case provided so as to cover the first case,
the accommodation area has
a first accommodation area for accommodating at least a part of the electronic device, by the first case and the base, and
a second accommodation area formed by the first case, the second case, and the base, and
the vent is provided at a position that enables ventilation between the second accommodation area and the opening portion.

3. The device for a vehicle according to claim 1, wherein
a sealing member is provided on the base,
the opening portion is provided behind the base pad, and
the vent is provided at least on a side opposite to a position where the opening portion is provided with respect to a position where the sealing member is provided.

4. The device for a vehicle according to claim 1, wherein
the base has a rectifying unit that rectifies an air flow from the vent toward the opening portion.

5. The device for a vehicle according to claim 4, wherein
the rectifying unit is a rib extending from a bottom surface of the base.

6. The device for a vehicle according to claim 1, further comprising:
a protective wall provided in the vicinity of the opening portion.

7. A device for a vehicle comprising:
a base;
a case that forms an accommodation area for accommodating an electronic device, together with the base; and
a base pad attached to the base and having an opening portion,
wherein
the base has a vent for ventilation between the accommodation area and the opening portion,
the case has a first case, and a second case provided so as to cover the first case,
the accommodation area has
a first accommodation area for accommodating at least a part of the electronic device, by the first case and the base, and
a second accommodation area formed by the first case, the second case, and the base, and
the vent is provided at a position that enables ventilation between the second accommodation area and the opening portion.

8. The device for a vehicle according to claim 7, wherein
a sealing member is provided on the base,
the opening portion is provided behind the base pad, and
the vent is provided at least on a side opposite to a position where the opening portion is provided with respect to a position where the sealing member is provided.

9. The device for a vehicle according to claim 7, wherein
the device has a snap-fit structure as a structure for fixing the case and the base, and an opening provided in the snap-fit structure functions as the vent.

10. The device for a vehicle according to claim 7, wherein
the base has a rectifying unit that rectifies an air flow from the vent toward the opening portion.

11. The device for a vehicle according to claim 10, wherein
the rectifying unit is a rib extending from a bottom surface of the base.

12. The device for a vehicle according to claim 7, further comprising:
a protective wall provided in the vicinity of the opening portion.

13. A device for a vehicle comprising:
a base;
a case that forms an accommodation area for accommodating an electronic device, together with the base; and
a base pad attached to the base and having an opening portion,
wherein the base has
a vent for ventilation between the accommodation area and the opening portion, and
a rectifying unit that rectifies an air flow from the vent toward the opening portion.

14. The device for a vehicle according to claim 13, wherein the case has a first case, and a second case provided so as to cover the first case, the accommodation area has a first accommodation area for accommodating at least a part of the electronic device, by the first case and the base, and a second accommodation area formed by the first case, the second case, and the base, and the vent is provided at a position that enables ventilation between the second accommodation area and the opening portion.

15. The device for a vehicle according to claim 13, wherein a sealing member is provided on the base, the opening portion is provided behind the base pad, and the vent is provided at least on a side opposite to a position where the opening portion is provided with respect to a position where the sealing member is provided.

16. The device for a vehicle according to claim 13, wherein the rectifying unit is a rib extending from a bottom surface of the base.

17. The device for a vehicle according to claim 13, further comprising:

a protective wall provided in the vicinity of the opening portion.

* * * * *